Aug. 2, 1938.  H. F. SCHMIDT  2,125,522
TRACTOR
Filed July 13, 1935  2 Sheets-Sheet 1
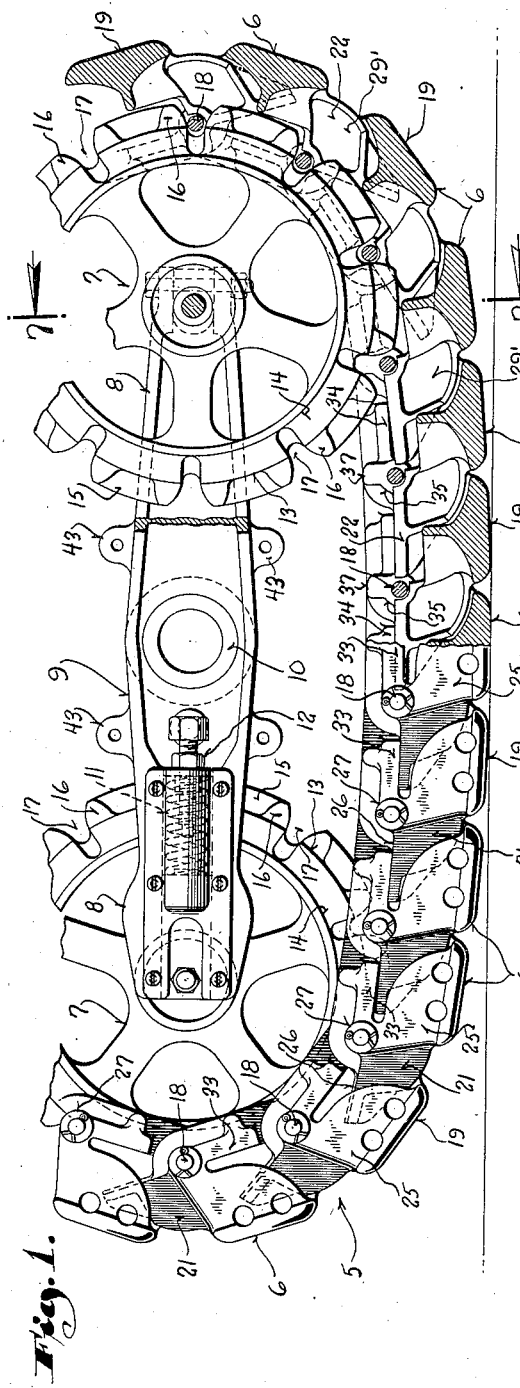
Inventor
Hugo F. Schmidt Aug. 2, 1938.  H. F. SCHMIDT  2,125,522
TRACTOR
Filed July 13, 1935 2 Sheets-Sheet 2
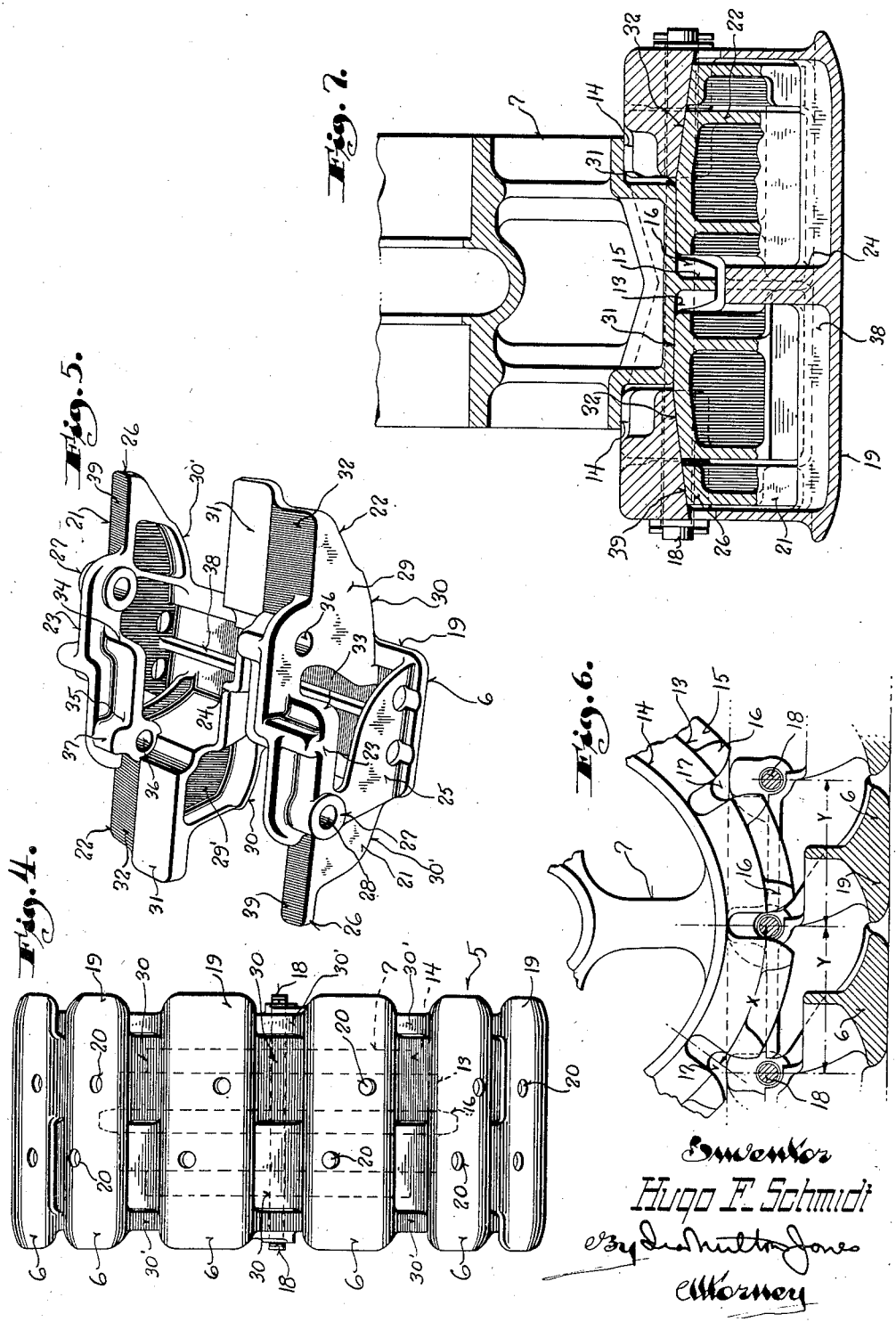
Inventor
Hugo F. Schmidt Patented Aug. 2, 1938

2,125,522

UNITED STATES PATENT OFFICE 2,125,522

TRACTOR

Hugo F. Schmidt, Milwaukee, Wis.

Application July 13, 1935, Serial No. 31,235

9 Claims. (Cl. 305—8)

This invention relates to improvements in crawler tracks for tractors and heavy duty trailers.

In general, these crawler tracks, comprise an endless, articulated chain or series of link units mounted to travel in an elliptical path about a set of wheels. The very nature of the conditions of use for which such devices are intended necessitates a sturdy, rugged construction free from closely fitted joints and connections, but in all past constructions, the links have been connected by closely fitted pins and very often, the design has been such that to obtain even a measurable degree of smoothness, the pins had to have a ground fit in their bearings. In view of the obvious impossibility of keeping dirt out of the joints, the fine fit of the pins in their bearings was soon destroyed and in a very short time, the track was worn to such an extent as to become useless.

With this objection to past crawler tracks in mind, it is an object of the present invention to provide an improved construction wherein the individual links are so joined and connected that smooth operation is obtained without the requirement for a close fit between the pin and its bearings. In fact, with the present invention, the bearing holes which receive the pins are oversize and require no machining.

Another very serious disadvantage of past crawler track constructions has been the fact that the arch which it is necessary to maintain, especially where the track is used for trailer purposes, was partially supported by the pins so that as the pins became worn, the arch broke down.

It is therefore another object of this invention to provide a crawler track construction wherein the individual links are so designed and interengaged that the maintenance of the arch is in nowise dependent upon the pins to thereby materially increase the useful life of the track.

Another object of this invention is to improve the construction and design of crawler tracks over past designs by eliminating slippage between the wheels about which the track is trained and the rolling surface of the track.

Another object of this invention is to provide a crawler track wherein the interengagement between the adjacent links is such that the track is self-aligning or in other words, is so designed that no load is imposed upon the pins when the equipment supported on the track is moving about a turn.

Another object of this invention is to provide a crawler track of such improved design as to permit high speed operation.

A further object of this invention is to provide a crawler track composed of a minimum number of parts easily assembled and cheaply manufactured.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a side view showing part of a crawler track constructed in accordance with this invention, with a portion thereof broken away and in section;

Figure 2 is a plan view looking down on the inside of one of the links;

Figure 3 is a plan view looking down on the inside of a series of connected links;

Figure 4 is an end view of the assembled track unit;

Figure 5 is a perspective view of one of the links;

Figure 6 is an enlarged detail section view through a portion of a sprocket wheel and several links to show the relationship therebetween; and Figure 7 is an enlarged cross section view through the track taken on the plane of the line 7—7 of Figure 1.

Referring now more particularly to the accompanying drawings in which like numerals indicate like parts throughout the several views, the numeral 5 designates the track generally which comprises an endless, articulated chain or series of link units 6 trained about a pair of sprocket wheels 7. The sprocket wheels are mounted between the arms 8 of a heavy H-shaped frame 9 provided at its center with a trunnion 10 to receive one end of an axle (not shown), the other end of the axle having a similar unit mounted thereon.

One of the wheels has its axle fixed with respect to the H-frame while the other has its axle adjustable endwise of the frame and yieldingly urged outwardly by a spring 11, the tension of which is adjustable by means of a screw 12. The spring balances the tendency of the track to crowd the wheels together and minimizes the load on the sprocket teeth thereby insuring smoother action and a minimum of wear.

As shown in Figure 7, the wheels are centered with respect to the width of the track and each wheel has a main rim or rolling surface 13 and auxiliary rims or rolling surfaces 14 provided by flanges projecting outwardly from the sides of the wheels, but radially inwardly of the main rim 13. A central web 15 projects radially from the main rim 13 and at spaced intervals is reinforced by lugs 16 at which points sprocket tooth spaces 17 are formed. The spaces 17 receive the pins 18 of the track, as will be hereinafter more fully described.

All of the links or track units 6 are alike and while in the present instance they are in the form of castings, they may be of built-up construction to permit the use of forgings.

In the following description of the links the terms "side" and "sides" shall apply to boundaries or edges of the links which together comprise the sides of the endless track as a whole, and the terms "end" and "ends" shall refer to the boundaries or edges of the links which lie adjacent each other and extend transversely across the track as a whole.

Each link or track unit comprises a tread 19 extending uninterruptedly across the width of the track. If desired, holes 20 may be formed in the tread through which dirt accumulated within the track is expelled.

At each side of the tread there is an outer arm 21 and an inner arm 22, the arms 21 being alike and the arms 22 being alike, but diagonally opposite. In other words, at one side of the tread the outer arm extends beyond one end of the tread and at the other side, it extends beyond the opposite end of the tread, and the inner arms are similarly disposed.

These arms 21 and 22 extend beyond the ends of the tread and are connected by bridges 23 and also by a central web or rib 24. Each outer arm 21 comprises a flange 25 projecting perpendicularly from the extreme side of the tread and an endwise projecting bracket portion 26 set inwardly of the flange 25 so that the flange 25 of an adjacent link can lie alongside the bracket portion 26. At the juncture of the arm 21 with the bridge 23, there is a bearing 27 provided with a hole 28 for the reception of a pin 18, the pin being retained in place by cotter pins.

The inner arms 22 of the links or track units are in the form of hollow cored out box-like structures projecting beyond the adjacent ends of the tread. Each inner arm 22 comprises sides 29 and 29' perpendicular to the tread and connected by a curved outer wall 30, and an inner wall formed by a flat rolling surface 31 and an inclined surface 32 which slopes downwardly and outwardly when the link is in ground engaging load carrying position.

As best seen in Figure 5, the webs 29 which form the outer faces of the arms 22 are disposed inwardly of the webs 25 to provide space therebetween for the reception of the projecting portions 26 of the arms 21 on the adjacent links, and it is noted that the bridges 23 which joint the arms 21 and 22 are offset so as to provide outer and inner ledges 33 and 34, respectively, the outer ledges 33 being contiguous with the bearing 27 and the inner ledges 34 being contiguous with a bearing 35 having a hole 36 in axial alignment with the opposite hole 28. The bridges 23 are suitably reinforced by upstanding ribs and adjacent each hole 36 the reinforcing rib merges into a lug 37.

The arms 21 and 22 are also suitably reinforced by the ribs and the tread has a central transverse reinforcing rib 38 running across the width thereof.

As already noted, the arms 21 and 22 at the opposite side of the links are diagonally opposite so that in assembling the links with each other the surfaces 39 of the projecting portions 26 of the arms 21 engage under the ledges 33 and the inclined surfaces 32 of the arms 22 engage under the inner ledges 34 which are correspondingly inclined. The ledges 33 and 34 provided by the bridge pieces 23 have, in fact, one continuous under surface which is inclined throughout its entire extent in correspondence with the inclination of the surfaces 32, and inasmuch as the surfaces 39 of the arms 21 engage under the ledges 33, these surfaces are likewise inclined.

This inclination of the meeting superimposed surfaces of adjacent links, as clearly shown in Figure 7, makes the track self-aligning. In other words, when the links are assembled a downward pressure thereon through the action of the interengaging inclined surfaces causes them to align automatically and thus precludes the possibility of imposing strain upon the pins 18 when the equipment supported by the tracks is being moved around a turn.

The meeting faces of the links besides being inclined, as described, are also so disposed that when the links are assembled the composite structure forms an inverse arch, as shown in Figure 1. The interlocking relationship of the interengaging surfaces of the adjacent links is such that one link is supported from the other and inward bending or a breaking down of the inverse arch is precluded without in anywise imposing stress upon the pins 18. In fact, the holes 28 and 36 which receive the pins are purposely made oversize so as to obviate the necessity for machining.

Hence, it will be seen that the maintenance of the inverse arch which is so necessary for free rolling in a track structure of the character described is maintained entirely independently of the pins so that any wear on the pins has no effect upon the maintenance of the arch.

As shown in Figure 3, when the links are assembled, the extended interlocking arms and consequently the rolling surfaces are telescoped into the adjacent links. The rolling surfaces 31 thus form a continuous rolling surface interrupted only by the spaces necessary to accommodate the pins 18 and these rolling surfaces which form in effect a track on which the sprocket wheels roll are so spaced as to contact the main rim or rolling surface 13 of the sprocket wheels. The lugs 37 are located directly outwardly of the surfaces 31 so as to be engageable with the auxiliary rims or flanges 14 of the wheels which they contact as the links roll around the sprocket wheels in traveling from the lower stretch to the upper stretch, and vice versa. In this manner, the load is supported without imposing any stress upon the pins.

Attention is directed to the manner in which the links coact to enclose the rolling surfaces. On the sides, the overlapping of the arms 21 by the flanges 25 effectually precludes the entrance of rocks and foreign matter, and on the ends of the assembled track, the space between the treads is closed by the curved outer walls 30 of the arms 22 acting in conjunction with the outer edges 30' of the arms 21. These surfaces completely close the space between treads as they separate in traveling about the wheels, and telescope under the treads as the treads move together. This closure of the spaces between the treads is an important feature of the present construction as it corrects a serious fault inherent in all past crawler tracks of the single unit link type. The space within the elliptical track is closed against the entrance of rocks and clumps of dirt by guards (not shown) fixed to the H-frame 9 by bolts threaded in lugs 43. Excluding the larger clumps of dirt, rocks and other foreign matter in this manner adds to the smoothness of the operation of the crawler track.

However, smoothness of operation is largely effected by the elimination of slippage between the track and the sprocket wheels. This is done by having the rolling surfaces between the wheels and the track units substantially on the pitch line of the track. As shown in Figures 6 and 7, the rolling surface is just a trifle above the pitch line and for practical purposes may be considered to be directly on the pitch line. Consequently, the arcuate distance X (see Figure 6) between the tooth spaces 17 is for all practical purposes equal to the distance Y which is the actual pitch of the track, or in other words, the distance between its pins. As a result, there is no slippage between the sprocket wheels and the track units during operation, but just a continuous smooth rolling action.

From the foregoing description taken in connection with the accompanying drawings, it will be readily apparent to those skilled in the art that this invention provides a crawler track having many advantages over past and existing tracks. Through the elimination of slippage between the sprocket wheels and the track, smoothness and ease of operation together with a reduction in wear is obtained. The free rolling action obtained also permits the track to be run at much higher speeds than heretofore possible.

Another very important advantage of the present construction is its low cost of manufacture. This is primarily due to the fact that no machining is necessary and to the small number of parts comprising the assembly, the track per se being composed of only two units, namely, the cast link and the pin. Machining is obviated even to the extent of making unnecessary the drilling of the holes in the links for the reception of the pins, as the construction is such that these holes may be oversize and therefore may be cored.

The design which makes machining unnecessary is also responsible for the advantage of having the arch maintained entirely independent of and without imposing any stress upon the pins. A rugged, inexpensive crawler track having many advantages over past and existing tracks is thus provided.

What I claim as my invention is:

1. In a device of the character described, a sprocket wheel, an endless crawler track trained about the sprocket wheel and comprising a plurality of articulated link units each having a ground engaging tread, pins joining said units and spaced equidistantly on a definite pitch line, the pin engaging portions of the units being overlapped so that there are two pins for each unit located substantially in line with the end of the ground engaging tread, the rim of the sprocket wheel having tooth spaces to receive said pins, said spaces being spaced apart a distance equal to the spacing of the pins as measured on a given pitch circle, a rolling surface on the rim of the wheel lying substantially directly on said pitch circle, and rolling surfaces on each link unit projecting endwise beyond each end of the ground engaging tread so as to be positioned between the pins of the adjacent units and lying substantially on the pitch line of the track to contact the rolling surface of the wheel with a non-slipping rolling engagement.

2. In combination, a sprocket wheel and an articulated crawler track, the sprocket wheel having a rolling surface on its rim and tooth spaces formed in the rim and projecting inwardly from the rolling surface, said crawler track comprising a plurality of similar link units having overlapped portions provided with aligned pin receiving apertures equispaced on the pitch line of the track, there being two sets of apertures for each unit, pins in the apertures to join the units, means on said overlapping portions of each unit disposed in opposite directions longitudinally of the track beyond the pivot pins of said units and between the pins of adjacent units providing rolling surfaces on a plane passing substantially through the axes of the pins and arranged for rolling engagement with the rolling surface of the sprocket wheel, and said rolling surface of the sprocket wheel lying substantially directly on the pitch circle on which the distance between its tooth spaces is equal to the spacing between the pins so that a non-slipping rolling engagement is afforded between the wheel and track.

3. In combination, a sprocket wheel and an endless articulated crawler track, the track comprising a plurality of similar link units, pins joining the link units, contact surfaces on the link units forming a continuous rolling surface interrupted only adjacent the pins, a rolling surface on the rim of the wheel engageable with said contact surfaces of the link units and adapted to roll thereon, said rim of the wheel having spaces for the reception of the pins, lugs on the link units projecting above the contacting surfaces thereof adjacent the pins, and cooperating means on the rim of the wheel engageable with said lugs to transmit the weight borne by the wheel to the track independently of the pins whenever the wheel is centered above a pin.

4. In combination, a sprocket wheel and an endless articulated crawler track, the crawler track comprising a series of similar link units each of which has a tread and upstanding portions attached to the tread, said upstanding portions having offset parts to permit overlapping of said parts of adjacent links, pins joining the overlapping parts, contact surfaces on the upstanding portions of the links lying in planes substantially passing through the centers of the pins so that the contact portions of the assembled links form a continuous rolling surface substantially directly on the pitch line of the track and interrupted only by the pins which are disposed partially above and partially beneath said rolling surface, a rolling surface on the rim of the sprocket wheel arranged to engage the rolling surface of the track, said rim of the wheel having spaces to receive the pins, lugs projecting up from the rolling surface of the track adjacent the pins, and an auxiliary rolling surface on the rim of the sprocket wheel engageable with said lugs to prevent the imposition of weight upon the pins.

5. In combination, a sprocket wheel and an endless crawler track, said endless crawler track comprising a plurality of similar link units, pins joining the link units, contact surfaces on each link arranged at different distances from the tread of the link, one of said contact surfaces passing substantially through the centers of the pins and the other being a substantial distance above the centers of the pins, a main contact surface on the rim of the sprocket wheel engageable with the first mentioned contact surfaces of the links to normally carry the load, and an auxiliary contact surface on the rim of the wheel engageable with the second designated contact surface of the links to carry the load when it is centered above the pins.

6. A crawler track comprising a plurality of similar link units each of which consists of a ground engaging tread and arms spaced sidewise and projecting up from the tread when the tread is resting on the ground and projecting endwise beyond the ends of the tread, bridge pieces joining the arms of each unit, the projecting portions of the arms of one unit having a surface to surface engagement with the undersides of the bridge pieces of an adjacent unit, pins passing through the overlapping arms of adjacent units to hold the units together, and said surface to surface engagement between the projecting portions of the arms and the bridge pieces being inclined outwardly and downwardly towards the sides and bottom of the track as a whole so that upon the application of load the track is self-aligning.

7. A crawler track comprising a plurality of articulated link units each of which consists of a ground engaging tread and sidewise spaced inner and outer arms at each end of the tread and projecting upwardly therefrom when the tread is in ground engaging position and endwise beyond the ends of the tread, a bridge piece connecting each pair of inner and outer arms, the inner arms of each pair being at diagonally opposite corners of the tread and adapted to fit inside the correspondingly, but oppositely diagonally disposed outer arms of adjacent link units, pins passing through the overlapping inner and outer arms to hold the link units against separation, cooperating contact surfaces on the inner and outer arms and the bridge pieces adapted to engage and prevent bending of the track in one direction without in anywise imposing stress upon the pins but permitting free bending of the track in the opposite direction, and wheel engaging rolling surfaces on the inner arms of each link unit extending longitudinally of the track and lying beyond the ends of the tread and the pins of each link unit.

8. A crawler track comprising a plurality of articulated link units each of which consists of a ground engaging tread and sidewise spaced inner and outer arms at each end of the tread and projecting upwardly therefrom when the tread is in ground engaging position and endwise beyond the ends of the tread, bridge pieces connecting each pair of inner and outer arms, the inner arms of each pair being diagonally opposite and adapted to fit inside the correspondingly, but oppositely diagonally disposed outer arms on adjacent link units, pins passing through the overlapping inner and outer arms to hold the link units against separation, and cooperating contact surfaces on the inner and outer arms and the bridge pieces adapted to engage and prevent bending of the track in one direction without in anywise imposing stress upon the pins while enabling free bending of the track in the opposite direction, said cooperating contact surfaces being inclined outwardly and downwardly toward the sides and bottom of the track as a whole so that upon the application of load the track is self-aligning.

9. A crawler track comprising a series of articulated link units each of which consists of a ground engaging tread and oppositely projecting inner and outer arms at each side portion of the tread with each pair of inner and outer arms offset sidewise and with the inner arms diagonally opposite and the outer arms likewise diagonally opposite so that the inner arms of one link unit fit inside the outer arms of adjacent units, a bridge piece joining each pair of inner and outer arms, pins passing through the overlapping inner and outer arms of adjacent units to hold the arms against separation, there being two pins for each unit with one pin substantially in line with each end of the ground engaging tread, and both inner and outer arms having contact surfaces engageable under the bridge pieces of adjacent link units to support the track in the form of an inverted arch independent of and without imposing stress upon the pins, and rolling surfaces on the inner arms adapted to have a wheel roll thereon, said rolling surfaces projecting endwise beyond the ends of the ground engaging tread.

HUGO F. SCHMIDT.